United States Patent
Benisch et al.

(10) Patent No.: US 10,037,546 B1
(45) Date of Patent: *Jul. 31, 2018

(54) HONEYPOT WEB PAGE METRICS

(71) Applicant: Rocket Fuel Inc., Redwood City, CA (US)

(72) Inventors: Michael Jared Benisch, Redwood City, CA (US); Mark Charles Torrance, San Jose, CA (US); Ari Seth Levenfeld, Oakland, CA (US)

(73) Assignee: Rocket Fuel Inc., Redwood City, CA (US)

( * ) Notice: Subject to any disclaimer, the term of this patent is extended or adjusted under 35 U.S.C. 154(b) by 183 days.

This patent is subject to a terminal disclaimer.

(21) Appl. No.: 13/909,711

(22) Filed: Jun. 4, 2013

Related U.S. Application Data

(60) Provisional application No. 61/659,535, filed on Jun. 14, 2012, provisional application No. 61/803,878, filed on Mar. 21, 2013.

(51) Int. Cl.
*G06Q 30/02* (2012.01)

(52) U.S. Cl.
CPC ................. *G06Q 30/0248* (2013.01)

(58) Field of Classification Search
CPC .......................... G06C 30/0601; G06C 30/024
USPC ............................................... 705/26.1, 14.45
See application file for complete search history.

(56) References Cited

U.S. PATENT DOCUMENTS

| | | | |
|---|---|---|---|
| 6,308,210 B1* | 10/2001 | Fields et al. ................. 709/224 |
| 7,734,502 B1* | 6/2010 | Yehoshua ............. G06Q 30/02 705/14.47 |
| 8,244,752 B2* | 8/2012 | Buehrer et al. ............... 707/769 |
| 8,392,823 B1* | 3/2013 | Schneider et al. ............ 715/234 |
| 2006/0212350 A1* | 9/2006 | Ellis et al. ...................... 705/14 |
| 2007/0255821 A1* | 11/2007 | Ge et al. ........................ 709/224 |
| 2008/0114624 A1* | 5/2008 | Kitts .................................. 705/7 |
| 2008/0249798 A1* | 10/2008 | Tulshibagwale ....... G06Q 30/02 705/1.1 |
| 2008/0281606 A1* | 11/2008 | Kitts et al. ......................... 705/1 |
| 2010/0198697 A1* | 8/2010 | Brown et al. .............. 705/14.73 |
| 2010/0262498 A1* | 10/2010 | Nolet et al. ................ 705/14.71 |

(Continued)

OTHER PUBLICATIONS

Microsoft Computer Dictionary, Fifth Edition, 2002, Microsoft Press, p. 23.*

(Continued)

*Primary Examiner* — David J Stolenberg
*Assistant Examiner* — Michael Ezewoko
(74) *Attorney, Agent, or Firm* — Fenwick & West LLP

(57) ABSTRACT

An ad server logs web traffic regarding web page traffic by users. The web traffic is analyzed to determine web activity indicating that a user is being paid to fake legitimate web traffic. These users are referred to as abusive users. The web traffic is also analyzed to determine web activity indicating that a web page is artificially boosting its own traffic in order to earn undeserved advertising revenue. These web pages are referred to as honeypot web pages. Scores are determined for both users and web pages, where the scores indicate the likelihood that the associated user or web page is an abusive user or a honeypot web page, respectively. The ad server uses these scores to determine an amount to bid on future impressions to those users and web pages.

52 Claims, 9 Drawing Sheets

(56) References Cited

U.S. PATENT DOCUMENTS

2012/0084146 A1* 4/2012 Zwicky ..................... 705/14.47
2014/0165140 A1* 6/2014 Singla ................. G06F 11/3006
                                                        726/1

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Advanced Artificial Intelligence, Shi, World Scientific, 2011, pp. 430-458.*
Data Mining, Elsevier, Han and Kamber, 2006, pp. 234-274.*

* cited by examiner

HONEYPOT WEB PAGE METRICS

CROSS-REFERENCE TO RELATED APPLICATIONS

This application claims the benefit of U.S. Provisional Application No. 61/659,535, filed Jun. 14, 2012, and U.S. Provisional Application No. 61/803,878, filed Mar. 21, 2013, both of which are incorporated by reference in their entirety. This application is related to U.S. patent application Ser. No. 13/909,682, filed on Jun. 4, 2013, entitled "Abusive User Metrics", which is incorporated by reference in its entirety.

BACKGROUND

Field of Art

Embodiments of the present invention generally relate to web traffic and online advertising, and particularly to user and web page pattern of action behavioral analytics.

Description of the Related Art

Online advertising is a growing industry. Web pages often include space for content, as well as advertising space for impressions (e.g., individual instances or appearances of advertisements (ads)) presented with the hope of inducing the visitor (or user) to click on the impression and perform some desired act including, for example, visiting a specific web page, signing up for an electronic newsletter at a specific web page, or making a purchase from a specific web page. When the user performs the desired act, the user is considered to have "converted."

Web pages charge advertisers for the privilege of placing advertisements in advertising space. In the online advertising industry, often advertisers will work with separate ad servers to run advertising campaigns and purchase advertising space on web pages on behalf of the advertiser. Ad servers and advertisers both collect statistics regarding user traffic on web pages in order to make more informed advertising space purchase decisions. These statistics can include actions taken by those users on particular web pages, as well as historical information about particular users including other web pages visited and actions taken. The statistics can be used to determine which advertising spaces to purchase and the price to pay for those advertising spaces.

Generally, this results in a virtuous cycle, where web pages are able to at least partially sustain their existence through ad revenue. In turn, advertisers benefit from the increased exposure and access to consumers. By collecting statistics about users and web pages, advertisers can better target their advertising space purchases. However, given how easy it can be to create a new web page and sell advertising space, the online advertising industry as a whole is experiencing a rise in bad actors who set up fake web pages that are virtually devoid of useful content with the sole purpose of faking significant user traffic in order to artificially drive up the cost of advertising space on those fake web pages in order to obtain fraudulent advertising revenue. Generally, owners of such web pages will pay users to generate the fake user traffic, such that the user traffic is not a result of genuine interest by normal users. The additional traffic is used to trick advertisers into buying advertising space that they would not buy otherwise.

SUMMARY

An ad server analyzes web traffic between users and web pages to identify abusive users who are artificially inflating web traffic, often to honeypot web pages created specifically to garner undeserved advertising spend from online advertisers. The ad server determines which users are abusive and which web pages are honey pots by analyzing web traffic between users and web pages. User actions on web pages are also logged. The ad server analyzes user identifying information such as internet protocol (IP) addresses, cookies, and user agent information to correlate to link together the disparate actions of individual users across multiple data sources. Using the logged actions and user identifying information, a number of different abusive user metrics may be determined, each metric identifying a different part of abusive or normal behavior. One or more of these metrics can be combined to determine a confidence that a user is an abusive user. Similarly, using logged actions and user identifying information, a number of different honeypot web page metrics may be determined. One or more of these metrics can be combined to determine a confidence that a web page is a honeypot web page.

Knowledge of which users are abusive and which web pages are honeypots can be used to determine whether (and how much) to bid on an impression for a user or on a particular web page. Identifying honeypot web pages that have significant amount of fake traffic is beneficial to an advertiser in evaluating whether to purchase advertising space on that web page. Identifying abusive users who are unlikely to care about a purchased impression allows advertisers to save money by avoiding purchasing advertisements for those abusive users who have no interest in and in some cases will not even see the advertisement. This knowledge can also be used to determine whether to store web traffic data regarding a particular user or web page. By deleting or electing not to store web traffic of abusive users and honeypot webpages, ad servers can save on data storage costs.

DETAILED DESCRIPTION

I. Internet Advertising Computing Environment

Figure 1:
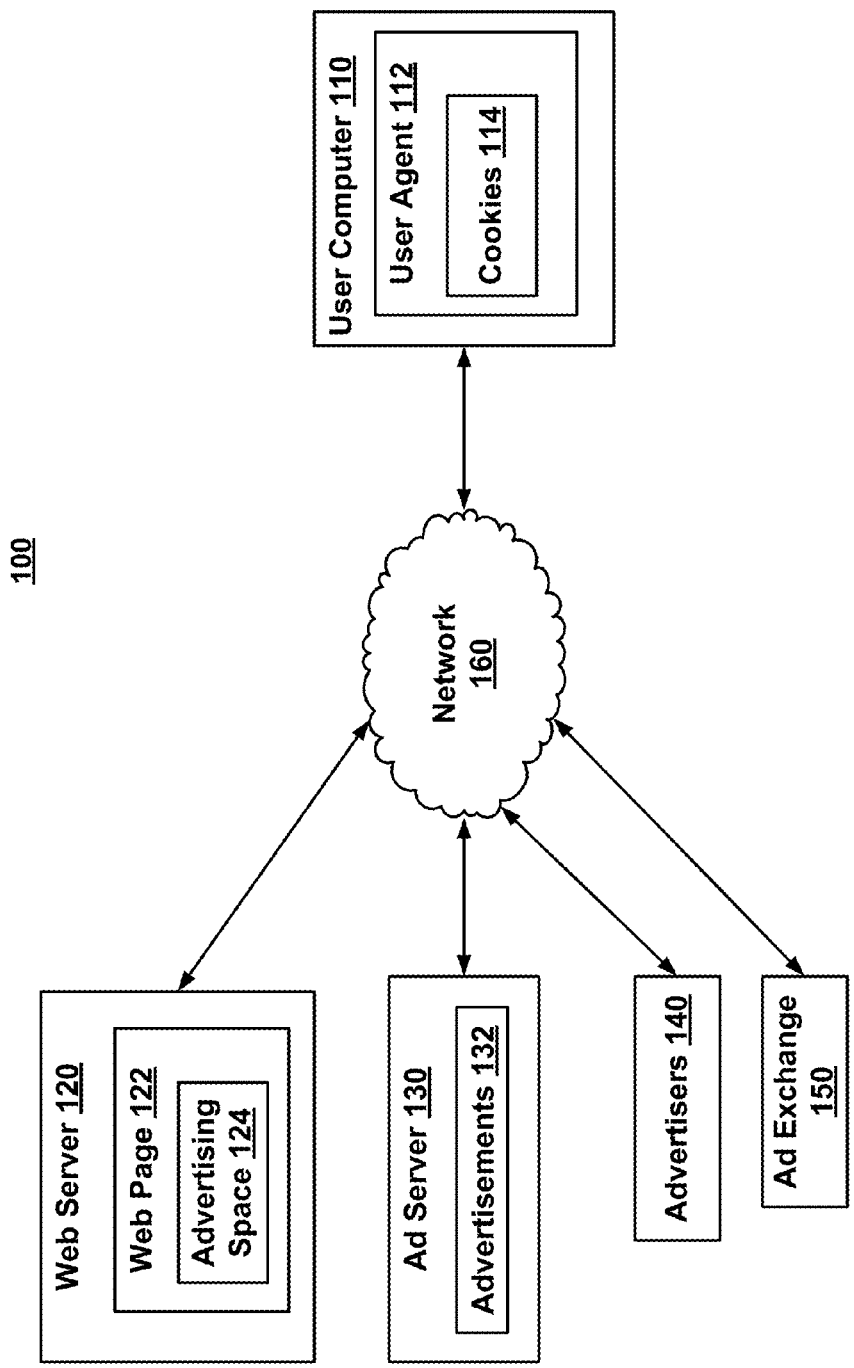
FIG. 1 illustrates a computing environment configured for delivering online advertising, according to one embodiment.

FIG. 1 illustrates a computing environment configured for delivering online advertising, according to one embodiment.

The computing environment 100 includes a number of different computing systems including a web server 120, an ad server 130, a publisher 140, an ad exchange 160, and a user computer 110, all communicatively coupled through a communications network 150 (e.g., the internet). For example, the computing systems may be programmed to communicate with each other using a networking protocol such as transmission control protocol/internet protocol (TCP/IP). Although only one of each type of computing system is shown, in practice many of each type of entity exist on the internet, and the various instances of each type of computing systems interact with each other on a frequent basis.

A user uses a computer 110 (e.g., a smart phone, tablet computer, laptop computer, personal computer, etc.) having a software user agent 112 to access web pages 122 provided by web servers 120. For sake of clarity, reference to a user 110 is a reference to the user computer 110, as a mechanism of abstracting away from the actual human actor or computer software (bot) controlling the computer 110. In many instances, the user's 110 web traffic, including page visits and actions on those visited web pages, will be locally stored in cookies 114 maintained by the user agent 112. Any given user computer 110 may make use of several different user agents to access web pages. A user agent includes the operating system of the computer 110 as well as the browser running on the operating system. Example of user agents include operating systems such as Apple's OS X™ and Windows 8™ and browsers such as Firefox™, Chrome™, Safari™, and Internet Explorer™. In some instances, a user will have different versions of the same user agent (e.g., Internet Explorer™ 6.0 vs. Internet Explorer™ 9.0). These different versions may be considered different user agents. In some instances, a user may have imported cookies 112 from one version of a user agent to another version of the user agent. Cookies 112 generally include information indicating the user agent and version of the user agent they are associated with, as well as user identifying information such as a cookie ID and a user's IP address.

The web server 120 stores and communicates a web page 122 to a user computer 110 in response to receiving a request from the user computer 110. Web pages are located at particular internet addresses (e.g., at a particular uniform resource locator (URL)), and generally include informational content such as audio media, video media, and/or interactive software code. Modern web pages often dynamically respond to user interaction, such that the interaction between the web server 120 and the user computer is a back and forth process. Many web pages also include advertising space 124 for the inclusion of impressions of ads that will be provided to users 110 viewing the web page. The web server 120 owner sells the advertising space 124 to advertisers 140 as a source of revenue.

There are several different mechanism for a web server 120 to sell advertising space 124 for their web pages 122. As one example, the web server 120 may contract with an ad exchange 150 that brokers the sale of advertising space 124. This reduces the burden on the web server 120 in managing the sale of its advertising space 124. The ad exchange 150 then auctions the advertising space 124 in real time responsive to a user's 110 request for a web page 122. The ad exchange 150 sends bid requests to ad servers 130 notifying them of the auction and requesting their bid to purchase the auctioned ad space 124. Ad servers 130, acting on behalf of advertisers 140, bid for the auctioned advertising space 124. The winning bidder wins the right to place an impression of an advertisement in the advertising space 124 that is presented to the user as part of the web page 122. This auction, bid, and placement process occurs in real time, and is referred to as real time bidding (RTB).

From the user's perspective, the web page 122 is sent to the user computer 110 in response to a user's request. The web page includes software code triggering an ad request to the ad exchange 150 to obtain advertising content to be placed in the ad space 124. The ad exchange 150 conducts the auction and responds to the user computer 110 with an ad tag including an instruction for a network location (e.g., a URL) for where to obtain the impression to be placed in the ad space 124. The user agent 112 processes the ad tag and obtains the impression. The impression may be provided by a computing system associated with the advertiser 140 or ad server 130, for example using a content delivery network (CDN) (not shown).

Advertisers 140 create advertising content to be placed in advertising spaces 124. To obtain advertising space 124, advertisers 140 partner with ad servers 130. Ad servers 130 work on behalf of advertisers 140 to purchase advertising space 124. Generally, ad servers 130 try to purchase advertising space 124 that is valuable to advertisers 140. There are many different strategies for determining what an advertiser 140 considers valuable, and so often the ad server 130 will work with the advertiser 140 to determine an advertising campaign strategy dictating which advertising space 124 the ad server 130 will buy. While the ad server 130 is depicted as a single entity in FIG. 1 for the sake of discussion, the ad server 130 may represent an ad-delivering system that may be implemented using a variety of architectures and configurations having multiple components, modules, and/or servers in communication. For example, the ad-delivering system may include ad-delivering servers, demand side platforms (DSPs), ad networks (horizontal and vertical), analytic platforms, data management platforms, data aggregators, targeted and behavioral advertising platforms, and/or campaign management systems.

Figure 2:
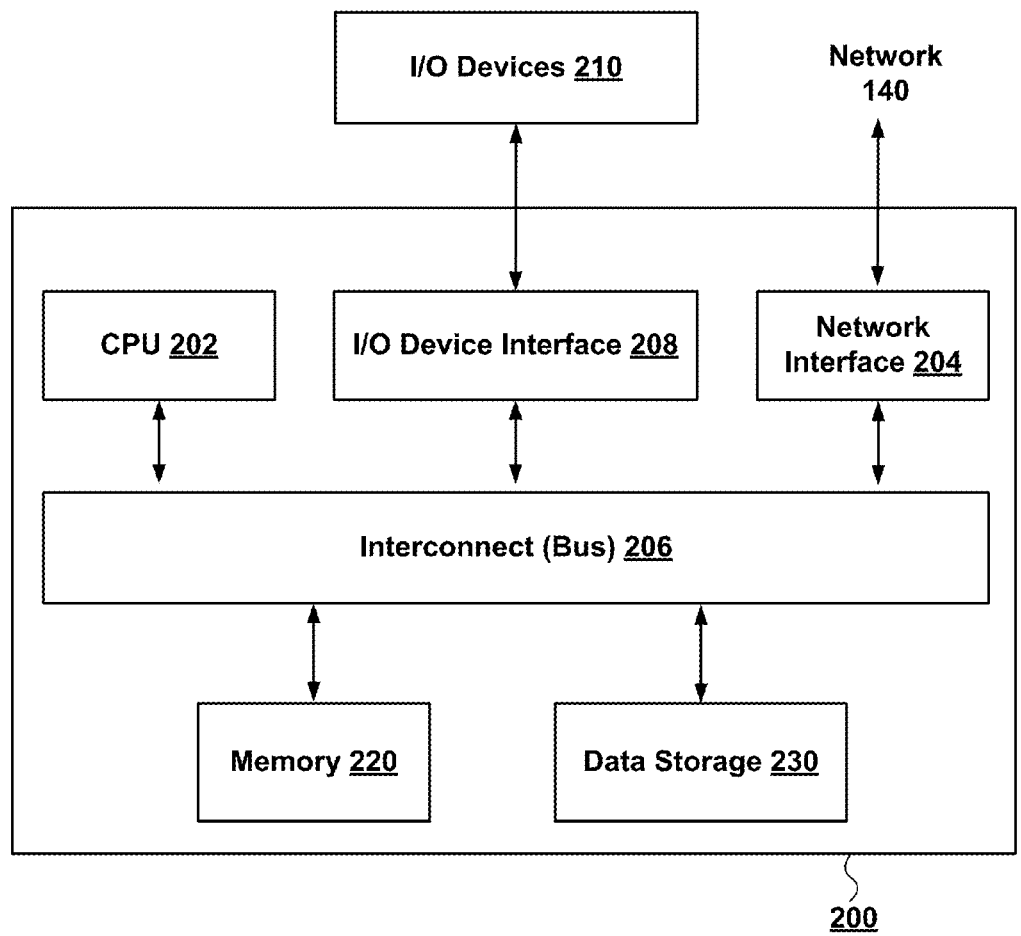
FIG. 2 is a block diagram of a computer for implementing an ad server or user computer, according to one embodiment.

FIG. 2 is a block diagram of a computer for implementing an ad server 130 or user computer 110, according to one embodiment. Each type of computing system may include one or more of each conventional component, e.g., a central processing unit (CPU) 202, system memory 220, a data storage 230, input/output (I/O devices 210 such as a mouse and a keyboard coupled through a I/O device interface 208, output devices such as a monitor, and a network interface 204 for communicating with other computing systems through network 140.

The CPU 202 retrieves and executes programming instructions and application data stored in the memory 220 and generally controls and coordinates operations of other system components. The interconnect bus 206 is used to transmit programming instructions and application data between the CPU 202, I/O devices interface 208, storage 230, network interface 204, and memory 220. The memory 220 is generally included to be representative of a random access memory and, in operation, stores software applications and data for use by the CPU 202. The data storage 230 may be a combination of fixed and/or removable storage devices, such as fixed disc drives, floppy disc drives, hard disk drives, flash memory storage drives, tape drives, removable memory cards, CD-ROM, DVD-ROM, Blu-ray, HD-DVD, optical storage, network attached storage (NAS), or a storage area-network (SAN) configured to store non-volatile data.

II. Ad Server Overview

Figure 3:
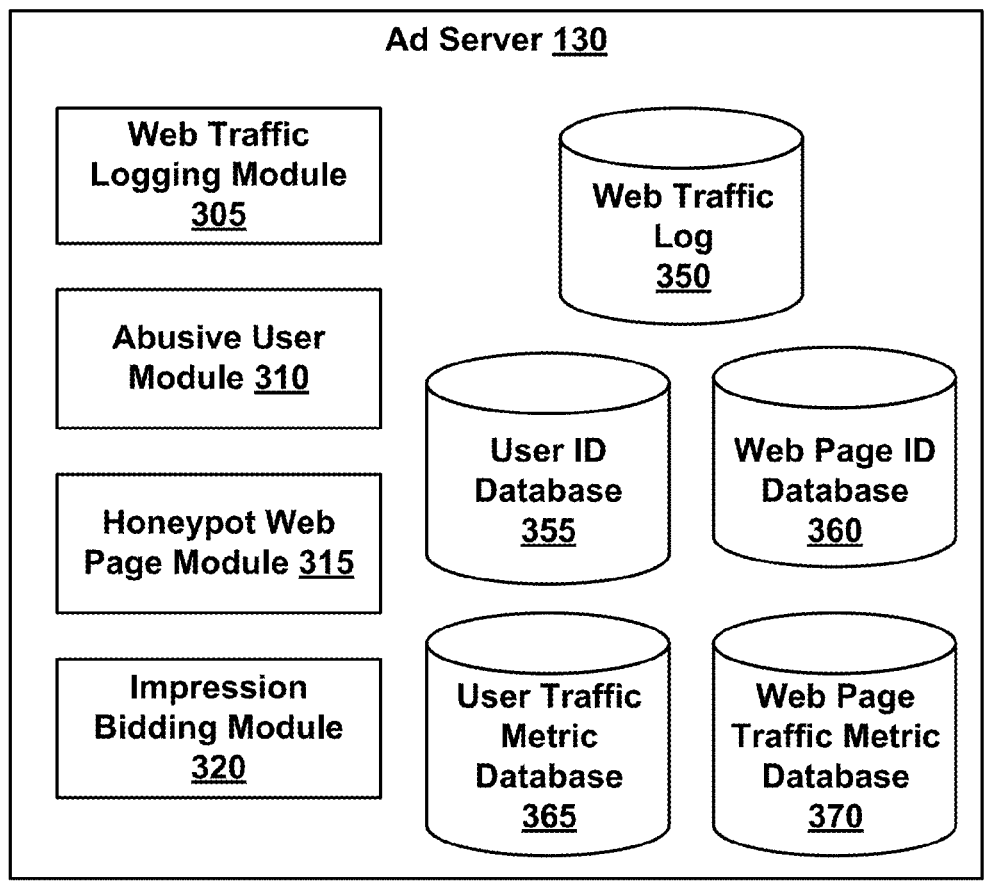
FIG. 3 is a block diagram of an ad server, according to one embodiment.

FIG. 3 is a block diagram of an ad server, according to one embodiment. The ad server 130 includes a web traffic logging module 305, an abusive user module 310, a honeypot web page module 315, and an impression bidding module 320. These modules process, store, and interact with data that is stored in one or more databases. These databases include a web traffic log 350, a user identification (ID) database 355, a web page ID database 360, a user traffic metric database 365, and a web page traffic metric database 370. The content and functions of the various modules and databases are described below.

The ad server 130 is configured to log and correlate the visits of users 110 to various web pages 122 for the purpose of determining which web pages are honeypot web pages that are artificially inflating their own traffic to generate false advertising revenue. The ad server is further configured to determine which users are abusive users that are causing the false traffic. Identifying abusive users and honeypot web pages assists the ad server 130 in a number of different ways, each of which is further described below.

As introduced above, user 110 visits to web pages reference are a reference to the user computer 110 transacting with the web pages, in order to abstract away from the actual human actor or bot controlling the computer 110. The identification that a particular user 110 is an abusive user, is not a determination that the real world user using the computer 110 is abusive, but merely that the computer 110 is the source of abusive web traffic. Consider bots and user agent 112 malware as examples. Some bots are run by real human actors who own and operate computers 110 dedicated to running the bots. Other bots are the result of malware that a malicious human actor has deliberately released and installed on another innocent user's computer 110. Thus, although the real human user who owns a particular computer 110 may generate some normal web traffic with a particular computer 110, that computer 110 may also be generating abusive web traffic due to the presence of malware. As a result of malware-generated web traffic, the computer 110 most frequently used by a particular real-world normal user may be flagged as being associated with an abusive user as described below, despite the fact that the computer 110 is also used by a normal user.

III. Web Traffic Logging and User Correlation

The web traffic logging module 305 (or simple logging module 305) is configured to receive data regarding user traffic on web pages on the internet, and to store the received data in the web traffic log 350. User traffic on web pages may be obtained by the logging module 305 in a number of different ways. For example, web pages code may include software code such as pixel tags that passively trigger the sending of web traffic data to the logging module 305. Bid requests received by the ad server 130 may also provide web traffic data. Cookies present in the user agent 112 may report web traffic data. Web servers 120 partnering with an ad server 130 may asynchronously provide web page user visit logs. Finally, the logging module 305 may also be configured to access external computing systems, such as web servers 120, to obtain data that they have been granted permission to request.

Regarding cookies specifically, cookies providing web traffic data to log 350 may include both first party and third party cookies. First party cookies are cookies maintained by the web page 122 the user 110 is interacting with, and third party cookies are cookies maintained by entities other than the owner of the visited web page, such as the ad server 130. First party cookie information may be made available to a third party such as an ad server 130 where the web page and the ad server have established a relationship. This may be the case, for example, where a web page 122 associated with an advertiser 140 and the ad server 130 exchange data to assist the ad server 130 in carrying out an ad campaign for the advertiser 140.

Web traffic may include a number of different types of data. This data includes at least two major categories: user identifying information, and information regarding actions taken by a user with respect to a visited web page. Generally, actions trigger individual entries that will be logged in log 350 with respect to a particular web page 120 and user 110. Using bid requests as an example, bid requests may include information identifying the web page 122 that is triggering the bid request, as well as user identifying information such as an IP address. The bid request may also include a timestamp, or alternatively the ad server 130 may add one when the bid request is received. Bid requests may also include the cost for the ad space, which either includes or can be used to determine cost per mille (CPM) and cost per click (CPC) for the web page.

In contrast to bid requests, pixel tags and cookies provide a wider variety of user identifying information and user action information. Regarding user identifying information, pixel tags and cookies may identify the user agent 112 being employed by the user 110, the user's IP address, and in the event the user's computer 110 is a mobile device, a mobile device identifier (UDID) and/or the current latitude/longitude of the user's mobile device. The ad server 130 and/or partner web pages 120/advertisers 140 may also create and assign a unique user ID (UID) to the user to help identify the user in the future. This UID may be reported by both tracking pixels and cookies, and may be shared between the ad server 130 and partner web pages 120/advertisers 140 to facilitate user identification.

Regarding user action information, pixel tags and cookies may report a wide variety of user interactions including, for example, web page visits by a user, navigation away from the web page to another web page, clicks on the web page, ad rendering within the web page, ad manipulation by the user, navigation away from an ad in the web page, mouse actions (e.g., hover, click, drag, scroll), keyboard actions, form entry with user-provided data in the web page (e.g., survey response input), challenge-response test input by a user (e.g., Completely Automated Public Turing test to tell Computers and Humans Apart input or CAPTCHA input), and credit card information entry and/or credit card transaction information. Pixel tags and cookies may also report (or, again, the ad server 130 may generate) timestamp information regarding each action.

Table 1 is an example subset of actions logged in the web traffic log 350 by the logging module 305. In this example, the data is organized by timestamp. Each entry in the log 350 includes one example form (e.g., IP address) of user identifying information (even though in practice others forms may be known for a given log entry), the web page visited as identified by a web page ID (WPID), an indication of whether an impression was purchased by the ad server 130 on the web page during the user's visit, the action triggering the log entry, and the timestamp when the data was received.

TABLE 1

Web Traffic Log

| User | Web Page ID | Impression? | Actions | Time |
|---|---|---|---|---|
| UID1 | WPID1 | Y | Credit Card Purchase | 2012-10-30 T 4:45:23 |

TABLE 1-continued

Web Traffic Log

| User | Web Page ID | Impression? | Actions | Time |
|---|---|---|---|---|
| UID2 | WPID2 | Y | CAPTCHA Entry | 2012-10-30 T 4:45:48 |
| UID3 | WPID3 | Y | Form Entry | 2012-10-30 T 4:46:01 |
| 19.168.2.3 | WPID1 | N | Click | 2012-10-30 T 4:46:08 |
| 19.168.5.7 | WPID2 | N | Web Page Visit | 2012-10-30 T 4:46:15 |
| f744456bd | WPID3 | Y | Navigate Away From Ad | 2012-10-30 T 4:46:16 |
| f744456bd | WPID1 | Y | Ad Manipulation | 2012-10-30 T 4:46:19 |
| a12345 | WPID2 | N | Mouse Action | 2012-10-30 T 4:46:40 |
| a67890 | WPID3 | Y | Keyboard Action | 2012-10-30 T 4:46:42 |
| UID1 | WPID1 | N | Ad Rendered | 2012-10-30 T 4:46:51 |

Between the variety of data sources (e.g., cookies, pixel tags, bid requests), and the variety of user identifying information that is included in the logged data, it is expected that the same real-world user may be responsible for many disparate entries log entries that are not connected when they are initially reported logged by the logging module 305. In order to assess the web traffic impact of an individual user, both generally and with respect to specific web pages, the logging module 305 is further configured to process the web traffic log 350 to populate the User ID database 355.

The logging module 305 populates the user ID database 355 by extracting user identifying information from each logged action. A new entry in the user ID database 355 is created when a particular log 350 entry has no items of user identifying information (e.g., cookie ID, IP address, etc) that already have a UID database 355 entry. However, if there is already an entry in UID database 355 for one of the user identifying information items in the log 350 entry, no new UID entry is created and instead the new user identifying information is added to the existing UID entry in database 355. Many logged 350 actions will contain more than one item of user identifying information, for example a logged action may have both an IP address and a cookie ID. If one item of user identifying information already has a UID entry in the database 355 and the other does not, this allows the logging module 305 to correlate the two items of user identifying information.

In this manner, multiple different types of user identifying information may be correlated together as being associated with the same user 110. This, in turn, allows for correlation of disparate web traffic log 350 entries that by themselves would not otherwise all be associated with the same user. To facilitate the identification of web traffic associated with a particular user, the logging module 305 is further configured to create a UID for each entry in the database 355. A new UID may be created each time a new UID entry is created in database 355. It is expected that later-in-time correlations between identifying information may result in some UIDs being unnecessarily duplicative. In these instances, the duplicative UIDs may be replaced, or the UIDs may be merged or linked together as all being related to the same user 110.

Table 2 is an example subset of user's logged web traffic. In this example UID1 is associated with several different IP addresses and user agents, and UID2 is associated with several different IP addresses and cookie IDs.

TABLE 2

User ID Database

| User ID | User Agent | Mobile Device ID | Lat/Long | IP address | Cookie ID |
|---|---|---|---|---|---|
| UID1 | Chrome | N/A | N/A | 192.168.100.1 | a12345 |
| UID1 | Safari | f7446bd759... | 37.4° N, 122.1° W | 192.168.100.2 | N/A |
| UID2 | Firefox | N/A | N/A | 192.168.100.1 | a67890 |
| UID2 | Chrome | N/A | N/A | 192.168.100.4 | a19283 |

The logging module 305 is also configured to populate the web page ID database 360 identifying known web pages. This is straightforward compared to the user ID database 355, as web pages can always be identified by a handful of known identifiers including, for example, their IP address, a domain name system (DNS) entry, and an Internet Corporation for Assigned Names and Numbers (ICANN) registration.

As above, the ad server 130 is configured to use the web traffic log 350, the web page ID database 360, and the user ID database 355 to identify abusive users and honeypot web pages. Generally, abusive users come in two varieties: real human actors who are paid to manually visit web pages and perform actions of various types (e.g., click on impressions, view impressions), and computer programs (referred to as "bots") that automatically visit web pages and perform conversions. Not all bots are maliciously generating fake traffic, some are simply visiting web pages to search for other information (commonly referred to as "scrapers"). Despite their lack of malicious intent, the bot traffic still makes it more difficult to identify and classify real human web page traffic.

IV. Abusive User Metrics

The abusive user module 310 is configured to analyze the web traffic stored in the web traffic log 350, the user correlation information stored in the user ID database 355, and the web pages IDs stored in database 360 to determine which users are abusive users. The abusive user module 310 generates an abusive user score: a numerical value indicating a confidence that the user is an abusive user. The abusive user module 310 generates the abusive user score for a user by comparing the user's logged actions on web pages against a set of behavioral patterns. Each pattern identifies either a type of abusive web behavior, or a type of normal user behavior. A separate metric is generated for each pattern. The abusive user score is a function of one or more of the generated metrics, depending upon the implementation used by the ad server.

General categories of patterns of abusive user behavior include patterns based on volume of web traffic (e.g., of bid requests, impressions presented, and/or actions taken), velocity of web traffic (e.g., of bid requests, impressions presented, and/or actions taken), derivations, normalizations, and/or combinations of volumes and velocities (e.g. click-through rate or CTR), short web page load-to-click times, repetitive action by a user, non-standard user agent 112 usage, visiting honeypot web pages, and a consistent lack of user identifying information for an IP address. General categories of patterns of normal user actions include performing form entry, entering CAPTCHA input, carrying out credit card transactions, and separately communicated first party (web page) user data.

With respect to patterns based on the user's action volume, action velocity, and web page load-to-click time, generally abusive users generate significantly more web traffic in a given period of time than normal users. On average, most normal users wait for web pages to at least partially render, interact with the web page using mouse, keyboard, or touch interface, and then perform actions accordingly. All of this takes time, on the order of hundreds of milliseconds to seconds between each action. In contrast, abusive users are generally trying to visit as many web pages as they can as fast as they can. Particularly with bots, the use of automated commands can allow the bots to not wait for pages to render, not interact with web pages via mouse keyboard or touch, and allow for clicking on ads or perform other desired actions for triggering advertising buys as quickly as possible. In the cases of bots, these actions occur at a rapid clip, much faster than the pace a normal human is possible of interacting.

IV.a Volume Metrics

For volume particularly, the abusive user module 310 generates a volume metric that contributes to the abusive user score. As above, generally abusive users will receive measurably higher volumes of bid requests, impressions, and actions than normal users. The abusive user module 310 analyzes log 350 and user ID database 355 to aggregate the web traffic associated with the user. The abusive user module 310 generates the volume metric based on any or all of the volume of bid requests, impressions, and actions associated with the user. As there are a number of different types of actions, the volume metric may be based on a particular type of actions (e.g., clicks on impressions), or on more than one type of action (e.g., clicks and web page visits). The volume metric may simply be the actual number of logged items under consideration, or some function thereof. If, for example, higher volumes contribute to a higher volume metric, the more web traffic that is logged for that user, the higher the volume metric will be and the more confidence the abusive user module 310 will have that the user is an abusive user. Similarly, particularly low volumes of these quantities result in a lower volume metric, which is indicative that the user is a normal user.

IV.b Velocity Metrics

Velocity patterns are patterns that track the volume of web traffic as a function of time. The abusive user module 310 generates a velocity metric that contributes to the abusive user score. The velocity metric are based on a number of bid requests, impressions, and/or actions logged within one or more time periods (e.g., over the course of a second, minute, hour, day, week, month, or any other time period). As with the volume metric, one or more different types of actions may be considered for inclusion in the calculation of the velocity metric. The velocity metric may simply be a time-normalized version of the volume metric (e.g., based on the length of the time period used in performing the calculation), or some function thereof. In one example, the more web traffic that is logged for a user within a given time period, the higher the velocity metric will be, and the greater the confidence that the user is an abusive user. Similarly, particularly low velocities of these quantities result in a lower velocity metric, which is indicative that the user is a normal user.

IV.c Derived Metrics

The abusive user module 310 is also configured to generate additional metrics for any combination of data from the web traffic log 350. For example, the number of clicks per impression a user receives (also referred to as click-through rate or CTR), the number of conversions the user performs per click (also referred to as conversions per click), and the number of conversions per impression (also referred to as conversions per impression or CVR) may all be derived from log 350. The abusive user module 310 is configured to calculate any or all of these metrics for inclusion in the abusive user score. For example, a CTR metric and a CVR metric may each contribute to the abusive user score. In one embodiment, normal user CTR ranges from 0.05 percent to 3 percent. A CTR greater than 3 percent results in high confidence that the user is an abusive user. Similarly thresholds may be set for other metrics.

Figure 9:
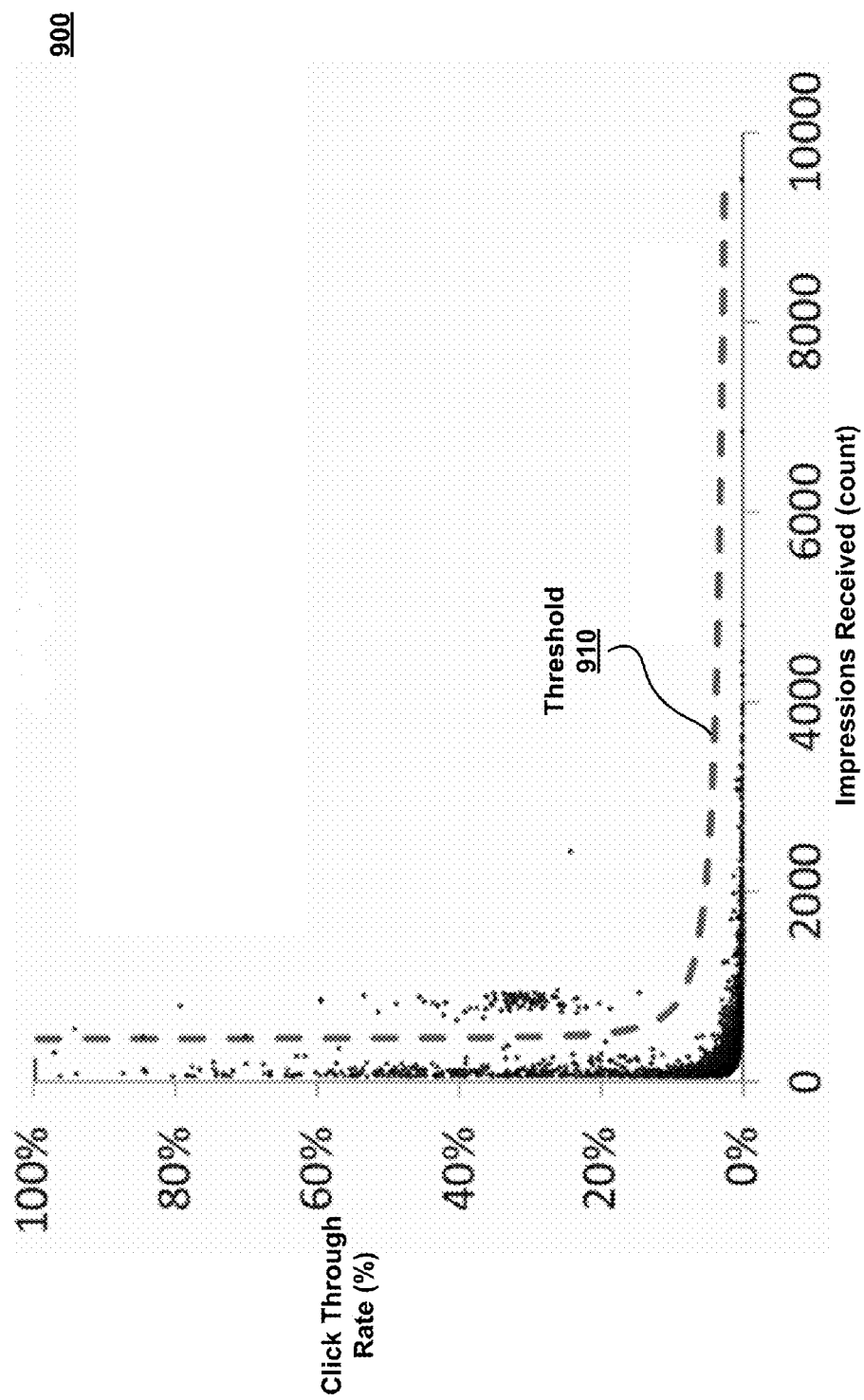
FIG. 9 is a graph showing a number of impressions received versus a percentage click through rate for a number of independent IP addresses, according to one embodiment.

FIG. 9 illustrates one possible example of a combination of logged actions that may be used to determine a metric that contributes to the abusive user score. FIG. 9 is a graph plotting a number of impressions received by a user against a percentage CTR for that user, for a number of users, according to one embodiment. In this example, a metric is generated for each user that is a function of both the number of impressions by the user and the user's CTR. The metric may set an abusive user threshold $T_a$ is defined relative to a user $T_u$ where:

$$T_a = \frac{CTR_T + \alpha}{I_T + \beta}, T_u = \frac{CTR_u}{I_u}$$

where $CTR_u$ is the user's CTR, $I_u$ is the number of impressions received by the user, $CTR_T$ is a threshold CTR, $I_T$ is a threshold number of impressions received, and $\alpha$ and $\beta$ are configurable constant offsets for adjusting the threshold. Based on $CTR_u$ and $I_u$, the user will either be above ($T_u > T_a$) or below ($T_u < T_a$) the abusive user threshold. If the user is above the threshold, the metric may be set to a high numerical value (e.g., 0.9 or 1) indicating a high confidence that the user is an abusive user, whereas if the user is below the threshold, the metric may be set to a low numerical value (e.g., 0.1 or 0) indicating a high confidence that the user is a normal user. This metric alone may be dispositive of whether a user is an abusive user, or like other metrics it may be just one of multiple metrics used in determining if the user is an abusive user.

The abusive user module 310 may determine the above metrics (e.g., volume, velocity, CTR, CVR) using an independent reference that is predetermined (e.g., generated using independent statistical modeling of normal user web traffic) or otherwise provided to the abusive user module 310. For example, a velocity of 5000 pages per day may correspond to a velocity metric of 0.9, and a velocity of 50 pages per day may correspond to a velocity metric of 0.1. Alternatively, the abusive user module 310 may determine one or more of the metrics based on the analyzed value (e.g., volume, velocity, etc.), in relation to the population of logged users as a whole, for example an average, percentile, standard deviation, median, mean, mode, or another outlier calculation. In this way, metric calculations can keep pace with changing web behaviors. The population of logged users as a whole may be filtered to only include users who are not flagged as being abusive. Continuing with the above example of higher metrics indicating a higher confidence that a user is an abusive user, a high CTR metric of 0.9 may be assigned where a user has logged behavior 350 indicating a CTR that is a standard deviation or more above the mean for normal users, whereas a low CTR metric of 0.1 may be assigned where a user has logged behavior 350 indicating a CTR that less than one standard deviation above the mean for normal users.

IV.d Web Page Load-to-Click Metric

For web page load-to-click time, the abusive user module 310 analyzes log 350 to determine the amount of time between when a web page visit action and a click action on that same web page. Each of these actions will generally be recorded as a separate event in log 350. The difference between these two times may be determined for a number of different web page visits by a user and analyzed to determine an aggregate (e.g., average) web page load-to-click for the user. As above, bot-type abusive users generally do not actually view visited web pages, they often click on an impression or perform another action before impressions have actually been rendered by the user agent. Web page load-to-click time may also be provided by other mechanisms. For example, code running on a web page (e.g., Javascript™ triggered as part of the firing of a pixel tag), can communicate to the ad server whether a user is actually viewing impressions before clicking on them and/or the amount of time between load and click.

The abusive user module 310 uses this information to generate a load-to-click metric. Continuing with the example above, higher load-to-click metrics correspond to shorter load-to-click times, indicating a higher confidence that a user is an abusive user. Correspondingly, lower load-to-click metrics correspond to longer load-to-click times, indicating a lower confidence that a user is an abusive user. The exact manner in which the load-to-click metric is generated may vary by implementation. For example, the load-to-click metric may be based on a user's average load-to-click time, median load-to-click time, mode load-to-click time, or another outlier calculation. The load-to-click metric may also be based on the number web page visits where the user visited a web page and clicked (or performed another action) before advertisements have been loaded.

IV.e Repetition Metrics

The web traffic of abusive users often exhibits repetitive patterns of behavior. Generally, real humans do not visit the same web pages over and over at precise time intervals. This type of behavior is generally reserved to bots running through a loop of web pages at a regular interval. The abusive user module 310 is configured to analyze the user's web traffic from log 350 to identify repetitions in behavior. Repetition may be exhibited in the form a user visiting, triggering a bid request, or performing some other action on a particular web page at a regular interval, to within a threshold precision in time between visits. Repetition may also be exhibited in the form of a user visiting, triggering a bid request, or performing some other action on a particular series of web pages in a particular repetitive order. Repetition may also be exhibited in the form a repetitive user action (e.g., a click) to the same x,y pixel location within the x,y coordinate axis of the displayed web page. Repetition of such an interaction with the displayed web page may be effort on the part of an abusive user to avoid classification as a bot and/or to provide another false data point for inflating web traffic.

Other types of repetition are also possible. A user agent 112 that has been compromised by malicious software (malware) or a bot controlling a user agent 112 may make multiple bid requests for one user at exactly the same time on a single page. The practical result of such a request would be a web page with multiple impressions visually stacked on top of each in the viewed web page. This is not normal behavior, as the top impression would obscure the others. The purpose of such requests is to falsely inflate the web page's traffic by falsely inflating the number of bid requests made to the web page. Such behavior could be detected by analyzing log 350 for repetitions in bid requests at the same time.

The abusive user module 310 generates a repetition metric based on the detection or absence of repetitive behavior according to the factors listed immediately above. Continuing with the example above, higher repetition metrics correspond to a presence of repetitive behavior indicating a higher confidence that the user is an abusive user, whereas a lack of repetitive behavior indicates the opposite.

IV.f User Agent Metrics

User agents 112 also provide insight into abusive web behavior. The abusive user module 310 is configured to generate a user agent metric indicating a confidence that a user is an abusive user based a number of different factors related to the user's employment of user agent to carry out web traffic. Each of these factors can individually contribute to the user agent metric.

One such factor is where a single UID in the user ID database 355 has logged web traffic originating from more than one user agent. Although many normal users will use several different user agents (e.g., Chrome, Firefox, and Internet Explorer), consistent use of several different user agents can be suggestive that a user is an abusive user. Examples of such consistent use include simultaneous or near simultaneous web actions from multiple user agents and repeat behavior where the user visits the same web pages and/or performs the same actions on those web pages across multiple user agents. In one example, use of multiple user agents increases the abusive user score, which corresponds to an increased confidence that the user is an abusive user.

Another factor in determining the user agent metric is where a single UID in the user ID database 355 has logged 350 web traffic from multiple versions of a user agent. It is generally uncommon for a normal user to be running multiple versions of a user agent. An example exception to this is where a user needs the outdated version of the user agent to access a legacy system that is incapable of interfacing with the more modern version of the user agent. However, the web traffic log 350 of such behavior is generally distinguishable in that the relatively few web pages of the legacy system will be visited by the old version of the user agent, whereas most user traffic will take place over the new user agent. In the case of an abusive user, however, often a significant amount of web traffic will be logged 350 as attributable to the outdated version of the user agent. Continuing with the above example, use of multiple versions of a user agent increases the abusive user score, which corresponds to an increased confidence that the user is an abusive user.

Another factor in determining the user agent metric is the presence of cookie information in a first version of a user agent, where the cookie was created using a second version of the user agent. This can occur where a user has imported a cookie for use in another version of the user agent. Generally, normal users will not go to such trouble to save and reuse old versions of cookies. However, abusive users often make use of old versions of cookies to increase the speed at which they can visit as many web pages as possible. Continuing with the above example, the presence of cookies created with a version of the user agent that does not match the version of the user agent actually being used in the logged 350 web traffic increases the user agent metric, which corresponds to an increased confidence that the user is an abusive user.

Another factor in determining the user agent metric is log 350 entries indicating that a user is visiting web pages with an unusual user agent. Examples of unusual agents include very outdated versions of common user agents, for example Firefox version 1.0, as well as discontinued user agents that are no longer supported or in active development, for example Netscape. Continuing with the above example, logged 350 web traffic from an unusual user agent increases the user agent metric, which corresponds to an increased confidence that the user is an abusive user.

IV.g Loitering Metric

The web pages that a user visits can also provide an indication as to whether a user is an abusive user. At any given point in time, the ad server 130 may have already identified a set of web pages as being honeypot web pages. This information may be obtained from the web page traffic metric database 370. Generally, most of the traffic on honeypot web pages is from abusive users who are artificially boosting the honeypot web page's traffic. Consequently, it is uncommon for a normal user to visit a honeypot web page with any frequency. Often such honeypot web pages have little to no substantive content, thus a normal user has no incentive to revisit the web page even if they visit once accidentally. The abusive user module 310 is configured to determine a loitering metric that is based on the frequency of the user's visits to honeypot web pages. In one example, the more frequently a user visits honeypot web pages, the higher their loitering metric, which corresponds to a higher confidence that the user is an abusive user.

IV.h IP Reuse Metrics

The IP addresses associated with logged 350 web traffic can also provide insight into whether a user is an abusive user. Very often, each real user has their own IP address, as assigned by an internet service provider (ISP). Often, however, a single IP will be used by multiple users. This occurs frequently with corporations assigning IPs to individual employees, for example. Often traffic associated with re-used IP addresses can be correlated to separate UIDs using other user identifying information such as pixel tags and cookies. However both normal and abusive users have access to tools that allow them to clear their cookies, disable pixel tags, obscure their identity, or otherwise prevent correlation of their web activity with a UID. When IP addresses are being shared, this can make it difficult for the abusive user module 310 to detect abusive behavior.

Despite these tools, the manner in which normal users clear cookies, pixels, and other identifying information differs from the manner in which abusive users clear this information. Generally, normal users will only inconsistently clear this information. In contrast, if abusive users clear this behavior, they will often have the clearing process automatically clear this information with high frequency. For example, an abusive user may clear this activity between each iteration of a programmed set of web page visits, or every time they reload the user agent 112.

The abusive user module 310 is configured to analyze the IP addresses of logged 350 web traffic to identify patterns where an IP address is frequently (or always) associated with a new user. What constitutes a new user may vary by implementation, a new user may be defined as a user who has an IP address but no corresponding UID, cookie ID, UDID, or other user identifying information. The abusive user module 310 is configured to generate an IP reuse metric indicative of the frequency with which an IP address is reused by a number of new users. In one example, the more a given IP address is associated with new users, the higher the IP reuse metric, which corresponds to a higher confidence that the user is an abusive user.

IV.i Normal User Metrics

Some logged 350 actions are indicative that a user is a normal user, rather than an abusive user. These include actions such as web fillable form entries, receipt of CAPTCHA input, and the carrying out of credit card transactions. Web fillable form entries do not in isolation confirm a user is a normal user, however because they take time and additional effort to complete, most abusive users will avoid completing them wherever possible. Web fillable form entries may also be referred to "soft" conversions, as they represent a surmountable barrier to proving that user is a normal user. Logged 350 web traffic indicating a user has completed a fillable form is a weak indicator that a user is not an abusive user. CAPTCHA input is similarly indicative, as CAPTCHA input takes time and effort. However, because valid CAPTCHA input is generally more difficult to fake than fake fillable form input, valid CAPTCHA input may also be referred to as a "medium" conversion, as it represents a barrier to proving that a user is a normal user that is more difficult to surmount that most (if not all) fillable form inputs. Logged 350 web traffic indicating the completion of a CAPTCHA is a moderate indicator that a user is a normal user than a fillable form input. Credit card transactions require valid credit card information. Consequently, although credit card fraud is in itself a problem, generally abusive users do not go to the trouble of faking credit card transactions in order to boost web traffic. Credit card transactions may also be referred to as "hard" conversions. Logged web traffic 350 indicating the completion of a credit card transaction is a strong indicator that a user is a normal user.

The abusive user module 310 is configured to analyze the web traffic log 350 to identify soft, medium, and hard conversions to determine a normal user metric that contributes to the abusive user score. In one example, the more soft, medium, and hard conversions associated with a particular user, the higher the normal user metric, which indicates a higher confidence that the user is a normal user. Soft conversions contribute less to the normal user metric than medium conversions, and medium conversion contribute less to the normal user metric than hard conversions.

The abusive user module 310 may also receive data from a third party (e.g., from an advertising partner of the ad server 130) regarding information about known users. This information may include affirmations that particular users (e.g., as identified by their UID or by a cookie ID) are indeed normal users. The abusive user module 310 can use this information to override the normal user metric and abusive user scores for a user to automatically whitelist the user as a normal user. Alternatively, this information may simply contribute to the normal user metric. This information is not necessarily dispositive as a user's user agent 112 may have been compromised by malware which causes the user agent 112 to automatically carry out abusive user behavior. Consequently, even though a third party may trust a user, their logged 350 web traffic may contain contrary information.

IV.j Abusive User Score Examples

Table 3 is an example subset of users traffic metrics contributing to an abusive user score. For clarity, not all metrics introduced above are illustrated. Further, depending on the implementation the abusive user module 310 may make use of only one, some, or all of the metrics introduced above in determining whether a user is an abusive user. The abusive user score and metrics contributing to the score are stored in a user traffic metric database 365.

TABLE 3

| | User Traffic Metrics | | | | | |
|---|---|---|---|---|---|---|
| User | Action Volume/ Velocity Metrics | CTR Metric | Load-to-Click Metric | Bid Request Pattern Metric | User Agent Pattern Metric | Abusive User Metric |
| UID1 | 521/10.6 | 40% | 0.3 | 0.8 | 0.7 | 0.8 |
| UID2 | 24/.5 | 2% | .03 | .05 | 0.01 | 0.05 |
| UID3 | 823/11.2 | 35% | 0.9 | 0.4 | 0.01 | 0.9 |

Figure 5:
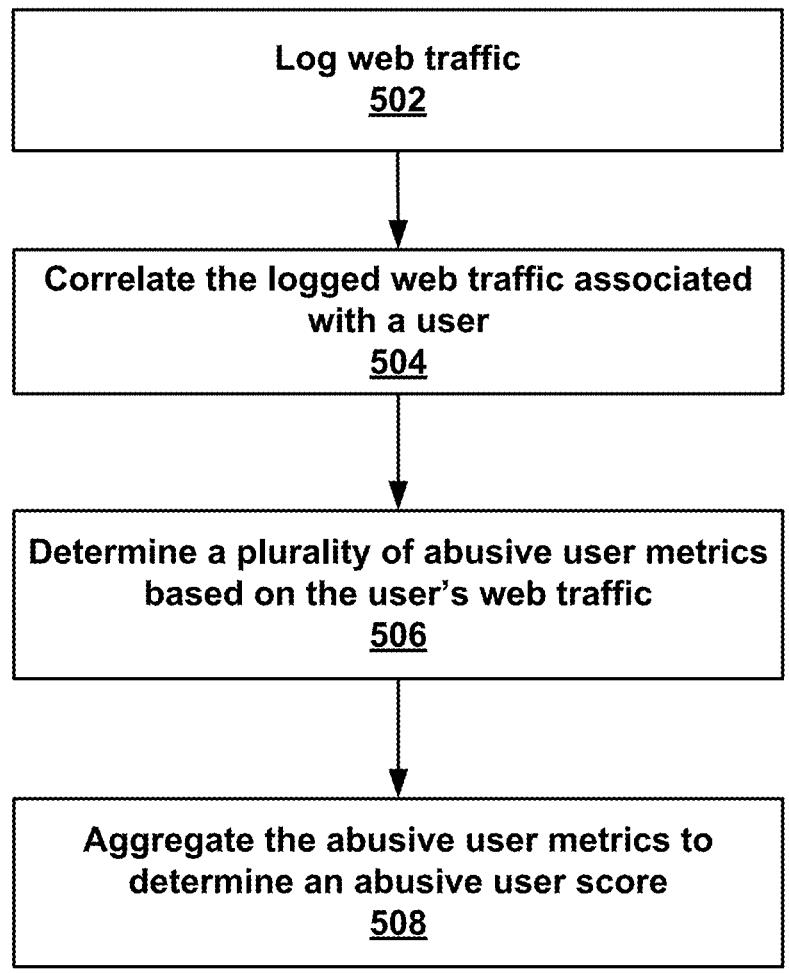
FIG. 5 is a flow diagram for determining an abusive user score, according to one embodiment.

FIG. 5 is a flow diagram for determining an abusive user score, according to one embodiment. The ad server 130 logs 502 web traffic between users and web pages in a web traffic log 350. The ad server 130 analyzes the logged 350 web traffic to correlate 504 the web traffic associated with a particular user. In one embodiment, the honeypot module 315 determines 506 at least two abusive user metrics based on the logged 350 data, though in other embodiments a single or additional metrics may be determined. The ad server 130 aggregates 508 the metrics to determine an abusive user score.

V. Honeypot Web Page Metrics

The honeypot web page module 315 (or honeypot module 315) is configured to analyze the web traffic stored in the web traffic log 350, the user correlation information stored in the user ID database 355, and the web pages identified in database 360 to determine which web pages are honeypot web pages. The term honeypot is generally used to describe a trap set to detect, deflect, or in some manner counteract attempts at unauthorized actions with regard to an information system. According to this description it generally consists of a computer, data, or a network site that appears to be part of a network, but is actually isolated and monitored, and which seems to contain information or a resource of value to attackers. Herein, a honeypot web page refers to a web page created specifically to garner undeserved advertising spend from online advertisers. Similarly to the description above, honeypot web pages are monitored to detect unauthorized actions, where herein unauthorized action broadly refers to the web traffic involving the honeypot web page used to garner undeserved advertising spend from online advertising spend. Differently from the description above, honeypot web pages are not created or controlled by the ad server 130, but are instead independently controlled by external entities.

The honeypot module 310 generates a honeypot web page score (or honeypot score): a numerical value indicating a confidence that a web page is a honeypot web page. The honeypot module 310 generates the honeypot score by comparing the web page's logged traffic by users against a set of behavioral patterns. Each pattern identifies a different kind of abusive behavior carried out by users on the web page. Alternatively, some patterns identify web behavior that is characteristic of normal user traffic on the web page. A separate metric is generated for each pattern. The honeypot score is a function of one or more of the metrics, depending upon the implementation used by the ad server 130.

V.a Example Web Page Metrics Similar to Abusive User Metrics

Many of the patterns used by the honeypot module 315 to identify honeypot web pages are similar to the patterns used to by the abusive user module 310 to identify abusive users. Examples of such patterns that are indicative of a honeypot web page include patterns based on volume of web traffic, velocity of web traffic, derivations, normalizations, and/or combinations of volumes and velocities (e.g., CTR, CTV), repetitive action by users, non-standard user agent 112 usage, a consistent lack of user identifying information for IP addresses visiting the web page. Example of web page patterns that suggest normal web page behavior that are similar to the above description include performing from entry, entering CAPTCHA input, and carrying out credit card transactions.

As above, the honeypot module 315 is configured to generate metrics for these patterns. These metrics include, using the patterns listed above as examples, a volume metric, a velocity metric, a CTR metric, a CTV metric, a repetition metric, and an IP reuse metric. The honeypot score may be based on the metrics. To calculate the metric, the honeypot module 310 is configured similarly to the abusive user module 315, except rather than analyzing the web traffic log 350 for traffic relating to a particular user (e.g., a particular UID), the honeypot module 315 is configured to analyze traffic relating to a particular web page (e.g., WPID). Otherwise, the description above for the determination of each of these metrics is similar. To avoid repetition, the full description of how the honeypot module 315 determines each of these metrics is not repeated, and instead several exemplary metrics are described.

Consider an example pattern based on the volume of web traffic to a web page. Honeypot web page employ abusive users to visit their web page a large number of times with the goal of attracting advertisers to purchase the advertising space 124 generated by these users. The honeypot module 310 generates the volume metric based on any or all of the volume of bid requests, impressions, and actions associated with the web page. As there are a number of different types of actions, the volume metric may be based on a particular type of actions (e.g., clicks on impressions presented by the web page), or on more than one type of action (e.g., clicks and user visits). The volume metric may simply be the actual number of logged items under consideration, or some function thereof. If, for example, higher volumes contribute to a higher volume metric, the more web traffic that is logged for that web page, the higher the volume metric will be and the greater the confidence that the web page is a honeypot web page. Similarly, particularly low volumes of these quantities result in a lower volume metric, which is indicative that the web page is a normal web page.

As another example, the honeypot module 315 is configured to generate a conversion per click metric for the users visiting the web page. In one example, a normal web page will have a conversion per click ratio that is greater than the 15th percentile of all logged web pages, resulting in a low conversion per click metric (e.g., 0.8) indicating a high confidence that the web page is a normal web page. Conversely, a web page that has a conversion per click ratio in a lower 15th percentile has a high conversion per click metric (e.g., 0.01) indicates a higher confidence that the web page is a honeypot web page.

V.b Rogue Visitor Metric

The honeypot module 315 is also configured to analyze patterns that are unique to the web page case that have no direct analog in the abusive user module 310. One such pattern is analyzing the list of users who are visiting a web page. As above, the abusive user module 310 may have already identified one or more of the users visiting the web page as abusive users. This information may be obtained from the user ID traffic metric database 365. Generally, most of the traffic on honeypot web pages is from abusive users who are artificially boosting the honeypot web page's traffic.

Conversely, at least a significant percentage of the traffic on a normal web page should be from normal users. The honey pot module 315 is configured to determine a rogue visitor metric that is based the proportion of visits to the web page by abusive users as previously determined by the abusive user module 310. In one example, the greater the proportion of web traffic attributable to abusive users, the higher the rogue visitor metric, which corresponds to a higher confidence that the web page is a honeypot web page.

V.c Price Metrics

Another such pattern is based on the CPM and/or CPC of the web page. The honeypot module 315 is configured to determine a price metric for a web page that is based on the web page's CPM and/or CPC. An industry average CPM for impressions on a normal web page is currently $1 to $2, though this figure is expected to vary in the future. A honeypot web page may attempt to induce the ad server 130 to show impressions by offering ad space 124 at a cost that is below the normal web page CPM. For example, a honeypot web page may offer ad space at a CPM at $0.10-$0.20, which is significantly less than the industry average CPM from the example above. The honeypot module 315 analyzes the difference between a web page's CPC and/or CPM relative to an industry CPM or CPC for normal web pages to determine the price metric. In one example, the lower the CPM and/or CPC relative to the industry average or median CPM and/or CPC, the greater the price metric, which corresponds to a greater confidence that the web page is a honeypot web page.

V.d Top Web Page Metric

Figure 7:
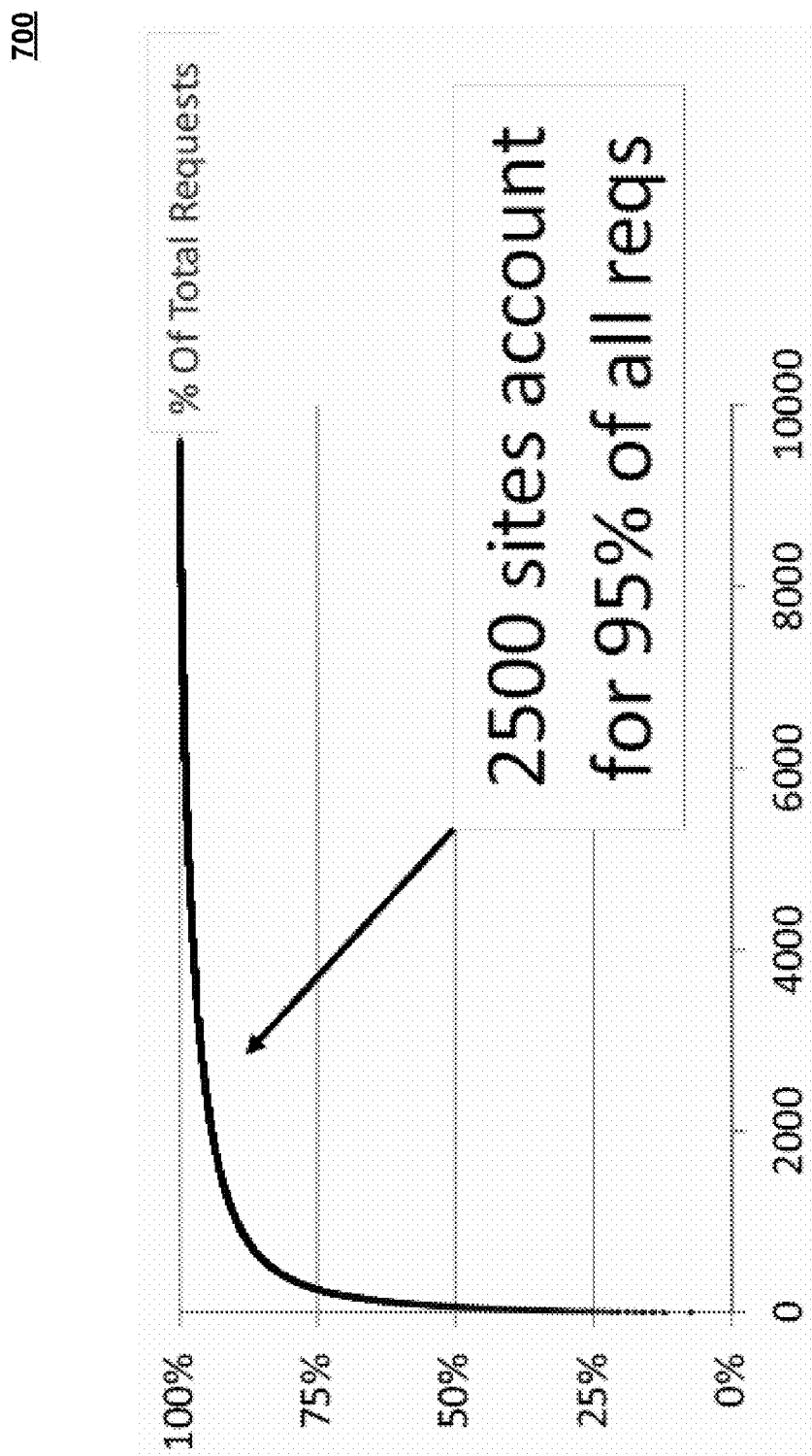
FIG. 7 is a graph showing the percentage of bid requests requested by monitored web pages versus the number of web pages making the bid requests.
Figure 8:
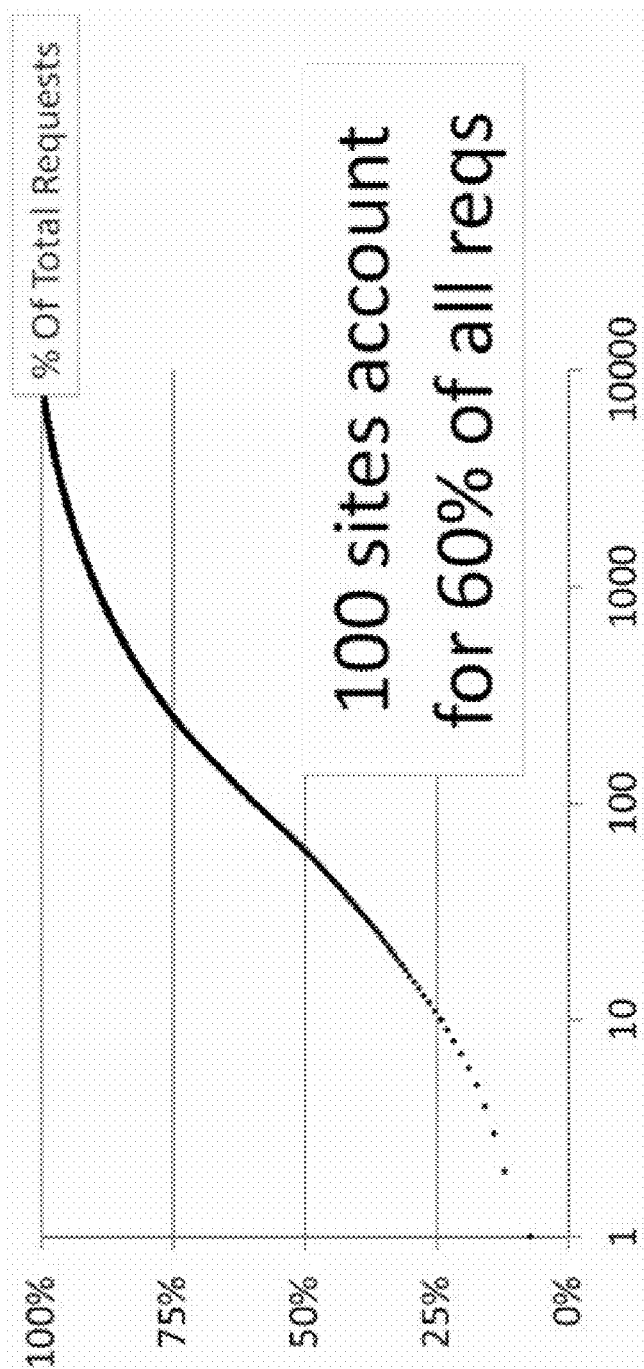
FIG. 8 is a graph on a logarithmic scale also showing the percentage of bid requests requested by monitored web pages versus the number of web pages making the bid requests.

Another such pattern relies on the assumption that despite the internet generally comprising a large number of web pages, relatively few web pages are responsible for most normal web traffic. FIGS. 7 and 8 illustrate this concept. FIG. 7 is a graph plotting the percentage of total bid requests generated by all known web pages on the y axis relative to the number of web pages generating that percentage of bid requests on the x axis. FIG. 8 is similar to FIG. 7, except the x axis indicating the number of web pages is on a logarithmic scale.

As shown in FIGS. 7 and 8, currently 100 web pages account for approximately 60 percent of all bid requests, and 2500 web pages account for about 95 percent of all bid requests. Although these figures are generally expected to change in the future, the general principle that relatively few web pages out of all available are responsible for most bid requests is not expected to change. Thus, by identifying by WPID in web page ID database 360 the relatively few web pages (e.g., 2500) that account for a significant majority of bid requests (e.g., 95 percent of all bid requests), the honeypot module 315 is able to generate a top web page metric that takes into account this principle. In one example, the top web page metric is lower (e.g., 0.01) if the web page under consideration is one of the top web pages as dictated by number of bid requests logged 350, representing a higher confidence that the web page is a normal web page. Conversely, the top web page metric is higher (e.g., 0.8) if the web page under consideration is not one of the top pages on the list, representing a lower confidence that the web page is a normal web page.

V.e Referral Metric

Another such pattern identifies which pages users visited prior to visiting a particular web page. Honeypot web pages often instruct the abusive users they have paid to visit a well known, normal web page first, and to subsequently visit the web page to be promoted. The goal of this behavior is confuse external ranking systems, for example Google PageRank™, into artificially believing that the subsequent web page is a worthy of a ranking it would not deserve otherwise. The ad server 130 is configured to generate a referral metric that analyzes the web traffic log 350 related to the subsequent web page to identify patterns in order of web pages visited by a user. In one example, the referral metric is higher responsive to log 350 traffic indicating that a user frequently visits a first, usually well known, web page first before visiting the subsequent, usually significantly less well known, web page. A high referral metric indicates increased confidence that the web page is a honey pot web page.

V.f Ad Coverage Metrics

Another such pattern measures the amount of ad space 124 on a web page, either on its own or relative to the amount of non-ad space on a web page. Normal web pages are generally focused on providing some form of meaningful content to users. Thus, usually the content takes up a significant portion of the web page's total screen real estate. In contrast, honeypot web pages generally are unconcerned with providing users with meaningful content. Many such honeypot web pages will contain only small amounts of content, often repurposed from other web pages. Instead, ad space 124 occupies a significant proportion of total screen real estate In some instances ad space 124 will overlap with itself, a clear indicator that the web page is honeypot web page as visitors will not be able to see the overlapped ads.

The ad server 130 is configured to generate an ad coverage metric for inclusion in the honeypot web page score. The ad coverage metric may be based on one or more of a percentage of screen real estate occupied by ads, a presence of ads overlapping in space, and a number of ads requested per page load. In one example, a higher ad coverage metric indicates a higher confidence that a web page is a honeypot web page.

V.g Honeypot Score Examples

Table 4 is an example subset of web page metrics contributing to a honeypot score. For clarity, not all of the metrics introduced above are illustrated. Further, depending on the implementation the honeypot module 315 may make use of only one, some, or all of the metrics introduced above in determining whether a web page is a honeypot web page. The honeypot score and metrics contributing to the score are stored in a web page traffic metric database 370.

TABLE 4

Web Page Traffic Metrics

| Web Page ID | Action Volume/ Velocity Metrics | Conversion per Click Metric | Rogue Visitor Metric | Repetition Metric | User Agent Metric | Honeypot Score |
|---|---|---|---|---|---|---|
| WPID1 | 20k/200 | 38% | 0.75 | .8 | .1 | .8 |
| WPID2 | 800/20 | 3% | .06 | 0.06 | .01 | .04 |
| WPID3 | 32k/300 | 37% | 0.8 | .9 | .7 | 0.9 |

Figure 6:
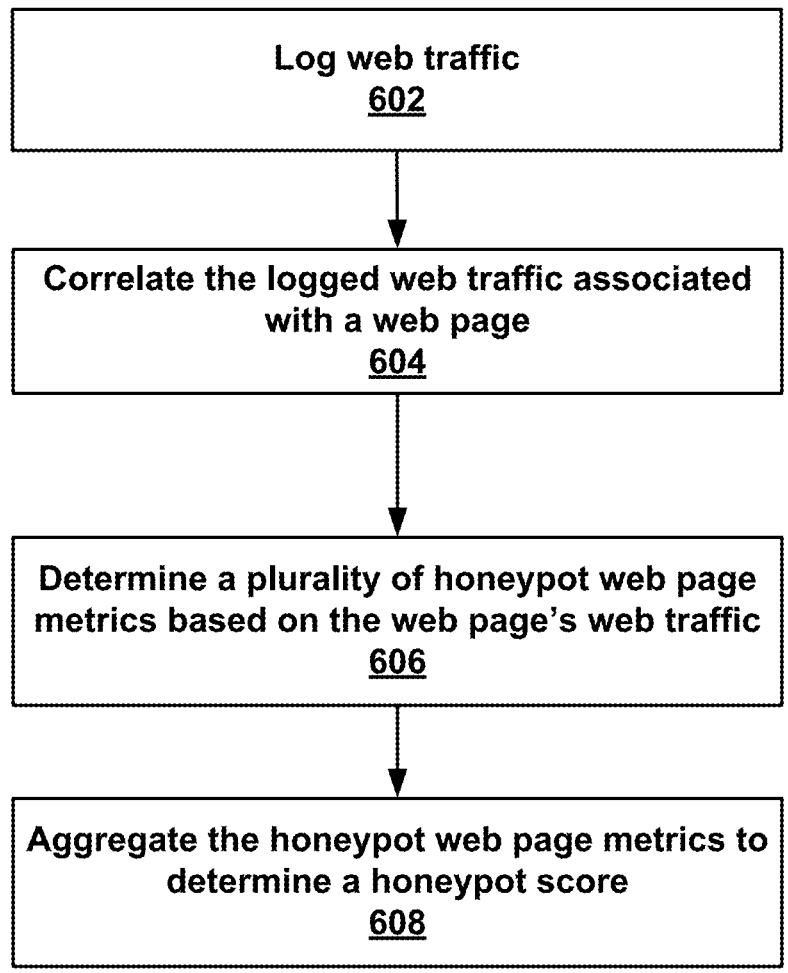
FIG. 6 is a flow diagram for determining a honeypot web page score, according to one embodiment.

FIG. 6 is a flow diagram for determining an abusive user score, according to one embodiment. The ad server 130 logs 602 web traffic between users and web pages in a web traffic log 350. The ad server 130 analyze the logged 350 web traffic to correlate 604 the web traffic associated with a particular web page. In one embodiment, the honeypot module 315 determines 606 at least two honeypot metrics based on the logged 350 data. The ad server 130 aggregates 608 the metrics to determine a honeypot score.

VI. Use Case Examples

The ad server 130 is configured to use the abusive user scores and honeypot scores for various users and web pages, respectively, for use in a number of different use cases. Examples of these use cases include determining whether and/or how much to bid on an advertising space 124 to be purchased to display an impression to a particular user, and determining whether to maintain storage of logged 350 web traffic regarding a particular user or web page. Each of these use cases is further described below. Other use cases for abusive user and honeypot scores include presenting the information to advertisers 140 about the success or failure of various advertising campaign strategies, and providing communication to external partners (e.g., ad exchanges 150) about which users are abusive and/or which web pages are honeypots.

VI.a Determining Whether and/or How Much to Bid on Advertising Space

Figure 4:
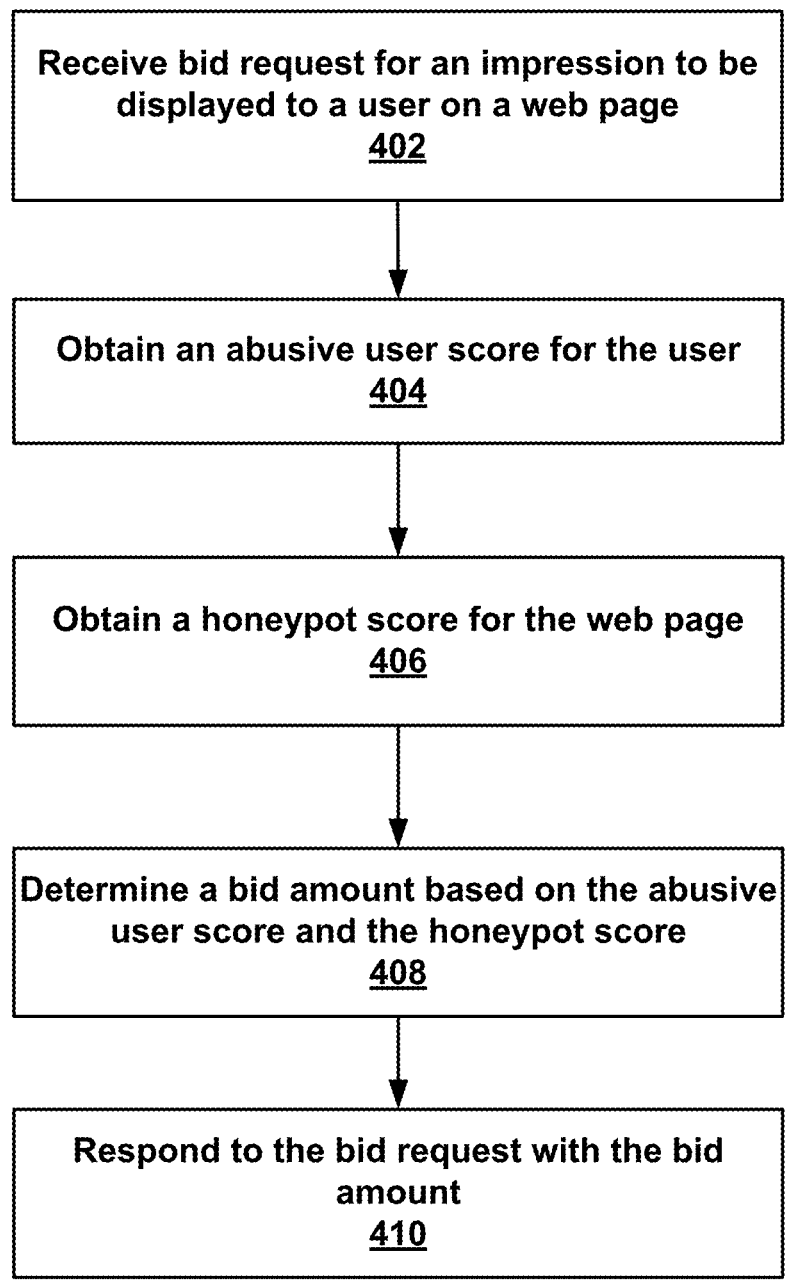
FIG. 4 is a flow diagram for determining a bid amount in response to a bid request, according to one embodiment.

The ad server 130 is configured to use the abusive user and honeypot scores to determine whether and how much to bid on an advertising space 124 to be presented to a user 110 as part of a web page 122. FIG. 4 is a flow diagram for determining a bid amount in response to a bid request, according to one embodiment.

The ad server 130 receives 402 a bid request from an ad exchange 150 offering the ad server 130 the opportunity to bid on the advertising space 124 to be presented to a user 110. The ad server 130 obtains 404 an abusive user score for the user 110 who will be presented the web page 122. An example process for obtaining 404 the abusive user score is described with respect to FIG. 5 above. The process of generating the abusive user score may be asynchronous from the process of responding to the received bid request. Often, the abusive user and honeypot scores for a user will have already been determined using prior web traffic log 350 data and stored in database 365. When responding to the bid request, the ad server 130 obtains 404 the abusive user score from a user traffic metric database 365. Alternatively, the abusive user score may be calculated real time in response to a received bid request. Similarly, the ad server 130 obtains 406 a honeypot score for the web page 122. An example process for obtaining 406 the honeypot score is described with respect to FIG. 6 above.

The ad servers 130 uses the abusive user score and the honeypot score to determine whether to bid on the ad space 124. One method of doing this is by numerically converting the abusive user and honeypot score into binary values. In one example, the abusive user and honeypot scores are numerical values between 0 and 1 where values closer to 1 indicate a higher confidence that the user is abusive or the web page is a honeypot, respectively. A threshold is set for each score. If the abusive user or honeypot score is above the corresponding threshold, the score is converted to 1 (e.g., yes, the web page is a honeypot web page or the user is an abusive user), if not the value is converted to 0 (e.g., no, the web page is a normal web page or the user is a normal user). As with calculating the underlying scores, these conversions of scores to binary may be performed in advance and stored for later user in the user 365 and web page 370 traffic metric databases. Based on these binary scores (yes/no), a determination is made whether to bid on the ad space 124. In one embodiment, if one or both of these values is 1 (yes), then the advertising space is not purchased. Otherwise, the ad space 124 is purchased.

In the same or a different embodiment, the ad server 130 uses the abusive user and honeypot scores to determine 408 a bid amount that the ad server 130 is willing to pay for the ad space 124 to present an impression to the user. Generally, the higher the confidence that the user 110 is an abusive user (e.g., a higher abusive user score), the less the ad server 130 will bid for the ad space 124. Similarly, the higher the confidence that the web page 122 is a honeypot web page (e.g., a higher honeypot score), the less the ad server 130 will bid for the ad space 124. The amount the ad server 130 bids may also depend on other factors, such as the advertising campaign the ad server 130 is running on behalf of an advertiser 140. The ad server then responds 410 to the bid request with a bid amount.

VI.b Determining Whether to Store Logged Data

The ad server 130 is configured to filter the logged 350 web traffic to reduce the amount of data that is more permanently maintained by the ad server for future analysis. Storing normal user and web page traffic for later analysis is useful to the ad server 130 in identifying user and web page habits. For example, the ad server 130 may use this information to improve advertising campaigns carried out on the behalf of advertisers 140. Storing web traffic associated with large numbers of users and web pages takes a lot of storage capacity. Initially storing all of this traffic in a log such as log 350 is not particularly burdensome from a data center storage cost perspective. However, storing all of this web traffic over the medium or long term is a significant cost for the ad server 130. To save on costs, the ad server 130 can opt to actively delete and/or choose to not continually store data associated with abusive users and honeypot web pages. Such web traffic data is of little analytical use to the ad server 130, and thus there is little downside to removing it. Further, by removing this logged 350 data, the ad server 130 is able to save significantly on data center storage costs.

The binary versions of the abusive user and honeypot scores determine which log 350 data is stored and which is deleted. In one example, the ad server 130 logs web traffic over a first time period between web pages and users, and uses that data to generate the abusive user and honeypot scores. These scores are then converted to binary form. During a second, later time period the ad server 130 logs additional web traffic. The ad server 130 then uses the previously determined abusive user and/or honeypot scores to determine which data is deleted and which data is maintained. In one example, the web traffic associated with a user is removed if the user has been determined to be an abusive user according to the binary version of the abusive score. Similarly, the web traffic associated with a web page is removed if the web page has been determined to be a honeypot web page according to the binary version of the honeypot score.

VII. Additional Considerations

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to embodiments of the present invention, other and further embodiments of the invention may be devised without departing from the basic scope thereof, and the scope thereof is determined by the claims that follow.

The invention claimed is:

1. A computer-implemented method comprising:
    storing, in a web traffic database, logged web traffic comprising visits by a plurality of users to a plurality of web pages, each web page receiving visits from a plurality of users;
    accessing a user identifier (UID) database storing a mapping of each of a plurality of UIDs to one or more items of user identifying information, the UID database mapping a first of the UIDs to a first item of user identifying information, and the UID database not including a mapping between the first UID and a second item of user identifying information;
    extracting the first and the second items of user identifying information from a first logged web page visit stored in the web traffic database;
    responsive to determining that the first UID is mapped in the UID database to the first item of user identifying information extracted from the first logged web page visit:
        associating the first logged web page visit with the first UID; and
        updating the mappings stored in the UID database to map the first UID to the second item of user identifying information;
    extracting the second item of user identifying information from a second logged web page visit stored in the web traffic database, wherein the second logged web page visit does not comprise the first item of user identifying information;
    associating the second logged web page visit with the first UID, responsive to determining that the first UID is mapped to the second item of user identifying information extracted from the second logged web page visit; and
    processing instructions with one or more processors of an ad server, the instructions configured to:
        identify a subset of logged web page visits from those stored in a web traffic database as visits to one of the web pages by a subset of the users, the subset of logged web page visits including at least one of the first logged web page visit and second logged web page visit associated with the first UID;
        calculate a plurality of different honeypot web page metrics based on the subset of logged visits to the web page by the subset of users, each honeypot web page metric indicating a confidence that the web page is a honeypot web page that is artificially inflating its own web traffic, wherein one of the honeypot web page metrics is based on a set of logged web pages associated with the first UID; and
        aggregate the honeypot web page metrics to determine a honeypot web page score indicating an overall confidence that the web page is a honeypot web page.

2. The computer-implemented method of claim 1 wherein one of the metrics is a volume metric having a numerical value based on at least one of a number of bid requests triggered by the subset of users, a number of impressions received by the subset of users, and a number of web page actions associated with the subset of users.

3. The computer-implemented method of claim 1 wherein one of the metrics is a velocity metric having a numerical value based on at least one of a number of bid requests triggered by the subset of users over a period of time, a number of impressions received by the subset of users over the period of time, and a number of web page actions associated with the subset of users over the period of time.

4. The computer-implemented method of claim 1 wherein one of the metrics is a click-through rate (CTR) metric having a numerical value based on a number of impressions the subset of users click on relative to a number of impressions the subset of users receive.

5. The computer-implemented method of claim 1 wherein one of the metrics is a conversion per impression (CVR) rate metric having a numerical value based on a number of conversions the subset of users carry out relative to relative to a number of impressions the subset of users receive.

6. The computer-implemented method of claim 1 wherein one of the metrics is a conversion per click rate metric having a numerical value based on a number of conversions the subset of users carry out relative to relative to a number of impressions the subset of users click on.

7. The computer-implemented method of claim 1 wherein one of the metrics is a rogue visitor metric having a numerical value based on a frequency of visits to the web page by one or more users previously determined to be abusive users who in visiting web pages garners significant advertising spend for those web pages.

8. The computer-implemented method of claim 1 wherein one of the metrics is a user transaction metric having a numerical value based on a number of web page credit card transactions completed by the subset of users.

9. The computer-implemented method of claim 1 wherein one of the metrics is a price metric having a numerical value based on at least one of a cost per mille (CPM) of impressions served to the subset of users, and a cost per click (CPC) of impressions clicked on by the subset of users.

10. The computer-implemented method of claim 1 wherein one of the metrics is a top web page metric having a numerical value based on a number of bid requests generated relative to other logged web pages.

11. The computer-implemented method of claim 1 wherein one of the metrics is a referral metric having a numerical value based on a plurality of prior web page visits by the subset of users prior to visiting the web page.

12. The computer-implemented method of claim 1 wherein one of the metrics is an ad coverage metric having a numerical value based on at least one of a percentage of the web page occupied by ads, a presence of overlapping ads in the web page, and a number of ads requested per page load.

13. The computer-implemented method of claim 1, wherein
    storing, at the web traffic database, logged web traffic comprising the visits by the users to the web pages, comprises:
        receiving a first set of web traffic log entries from one or more ad exchanges comprising bid requests for advertising space to be placed on the web pages;
        receiving a second set of web traffic log entries responsive to execution of software code present in one or more pixel tags included in the web pages; and
        receiving a third set of web traffic log entries responsive to execution of software code associated with one or more cookies stored by the user agents of the users.

14. A computer-implemented method comprising:
    storing, at a web traffic database, logged web traffic comprising visits by a plurality of users to a plurality of web pages, each web page receiving visits from a plurality of users;

accessing a user identifier (UID) database storing a mapping of each of a plurality of UIDs to one or more items of user identifying information;

extracting items of user identifying information from logged web page visits stored in the web traffic database;

for each of a subset of the UIDs, associating a subset of the logged web page visits with the UIDs based on the extracted items of user identifying information of the subset of the logged web page visits and the items of user identifying information mapped to by the UID in the UID database;

identifying a subset of logged web page visits as visits to a web page by the subset of UIDs;

calculating user agent scores for the subset of UIDs, each user agent score for a UID of the subset of UIDs, the user agent score having a numerical value based on logged web page visits associated with the UID from a number of different versions of a same user agent;

calculating a rogue visitor metric based on the user agent scores of the subset of UIDs; and calculating a honeypot web page score indicating a confidence that the web page is a honeypot web page that is artificially inflating its own web traffic, the honeypot web page score based on the rogue visitor metric.

15. The computer-implemented method of claim 7 wherein determining that a user of the subset of users is an abusive user is based on an abusive user score for the user.

16. The computer-implemented method of claim 15, wherein the abusive user score of a user is based on a user agent metric having a numerical value based on user web traffic comprising simultaneous or near simultaneous web actions from multiple user agents originating from the user.

17. The computer-implemented method of claim 15, wherein the abusive user score of a user is based on a user agent metric having a numerical value based on user web traffic from a later version of a user agent having a cookie from an earlier version of the user agent, the user web traffic associated with the user.

18. The computer-implemented method of claim 15, wherein the abusive user score of a user is based on a user agent metric having a numerical value based on user web traffic from a number of different versions of a same user agent, the user web traffic associated with the user.

19. The computer-implemented method of claim 14, wherein the honeypot web page score is further based upon a volume metric having a numerical value based on at least one of a number of bid requests triggered by the subset of users, a number of impressions received by the subset of users, and a number of web page actions associated with the subset of users.

20. The computer-implemented method of claim 14, wherein the honeypot web page score is further based upon a velocity metric having a numerical value based on at least one of a number of bid requests triggered by the subset of users over a period of time, a number of impressions received by the subset of users over the period of time, and a number of web page actions associated with the subset of users over the period of time.

21. The computer-implemented method of claim 14, wherein the honeypot web page score is further based upon at least one of:
a click-through rate (CTR) metric having a numerical value based on a number of impressions the subset of users click on relative to a number of impressions the subset of users receive, a conversion per impression (CVR) rate metric having a numerical value based on a number of conversions the subset of users carry out relative to relative to a number of impressions the subset of users receive, and a conversion per click rate metric having a numerical value based on a number of conversions the subset of users carry out relative to relative to a number of impressions the subset of users click on.

22. The computer-implemented method of claim 14, wherein each user agent score for a UID is further based on user web traffic comprising simultaneous or near simultaneous web actions from multiple user agents originating from a user associated with the UID.

23. The computer-implemented method of claim 14 wherein the honeypot web page score is further based upon a user transaction metric having a numerical value based on a number of web page credit card transactions completed by the subset of UIDs.

24. The computer-implemented method of claim 14 wherein the honeypot web page score is further based upon a price metric having a numerical value based on at least one of a cost per mille (CPM) of impressions served to the subset of users, and a cost per click (CPC) of impressions clicked on by the subset of users.

25. The computer-implemented method of claim 14 wherein the honeypot web page score is further based upon a top web page metric having a numerical value based on a number of bid requests generated relative to other logged web pages.

26. The computer-implemented method of claim 14 wherein the honeypot web page score is further based upon a referral metric having a numerical value based on a plurality of prior web page visits by the subset of UIDs prior to visiting the web page.

27. The computer-implemented method of claim 14 wherein the honeypot web page score is further based upon an ad coverage metric having a numerical value based on at least one of a percentage of the web page occupied by ads, a presence of overlapping ads in the web page, and a number of ads requested per page load.

28. The computer-implemented method of claim 14, wherein storing, at the web traffic database, logged web traffic comprising the visits by the users to the web pages, comprises:
receiving a first set of web traffic log entries from one or more ad exchanges comprising bid requests for advertising space to be placed on the web pages;
receiving a second set of web traffic log entries responsive to execution of software code present in one or more pixel tags included in the web pages; and
receiving a third set of web traffic log entries responsive to execution of software code associated with one or more cookies stored by the user agents of the users.

29. A system, comprising:
a web traffic database storing logged web traffic comprising visits by a plurality of users to a plurality of web pages, each web page receiving visits from a plurality of users;
a user identifier (UID) database storing a mapping of each of a plurality of UIDs to one or more items of user identifying information, the UID database mapping a first of the UIDs to a first item of user identifying information, and the UID database not including a mapping between the first UID and a second item of user identifying information;

a processor associated with the UID database, configured to:
  extract the first and the second items of user identifying information from a first logged web page visit stored in the web traffic database;
  responsive to a determination that the first UID is mapped in the UID database to the first item of user, identify information extracted from the first logged web page visit:
    associate the first logged web page visit with the first UID; and
    update the mappings stored in the UID database to map the first UID to the second item of user identifying information;
  extract the second item of user identifying information from a second logged web page visit stored in the web traffic database, wherein the second logged web page visit does not comprise the first item of user identifying information;
  associate the second logged web page visit with the first UID, responsive to determining that the first UID is mapped to the second item of user identifying information extracted from the second logged web page visit; and
an ad server comprising one or more processors configured to:
  identify a subset of logged web page visits from those stored in a web traffic database as visits to one of the web pages by a subset of the users, the subset of logged web page visits including at least one of the first logged web page visit and second logged web page visit associated with the first UID;
  calculate a plurality of different honeypot web page metrics based on the subset of logged visits to the web page by the subset of users, each honeypot web page metric indicating a confidence that the web page is a honeypot web page that is artificially inflating its own web traffic, wherein one of the honeypot web page metrics is based on a set of logged web pages associated with the first UID; and
  aggregate the honeypot web page metrics to determine a honeypot web page score indicating an overall confidence that the web page is a honeypot web page.

30. The system of claim 29, wherein one of the metrics is a volume metric having a numerical value based on at least one of a number of bid requests triggered by the subset of users, a number of impressions received by the subset of users, and a number of web page actions associated with the subset of users.

31. The system of claim 29, wherein one of the metrics is a velocity metric having a numerical value based on at least one of a number of bid requests triggered by the subset of users over a period of time, a number of impressions received by the subset of users over the period of time, and a number of web page actions associated with the subset of users over the period of time.

32. The system of claim 29, wherein one of the metrics is a click-through rate (CTR) metric having a numerical value based on a number of impressions the subset of users click on relative to a number of impressions the subset of users receive.

33. The system of claim 29, wherein one of the metrics is a conversion per impression (CVR) rate metric having a numerical value based on a number of conversions the subset of users carry out relative to relative to a number of impressions the subset of users receive.

34. The system of claim 29, wherein one of the metrics is a conversion per click rate metric having a numerical value based on a number of conversions the subset of users carry out relative to relative to a number of impressions the subset of users click on.

35. The system of claim 29, wherein one of the metrics is a rogue visitor metric having a numerical value based on a frequency of visits to the web page by one or more users previously determined to be abusive users who in visiting web pages garners significant advertising spend for those web pages.

36. The system of claim 29, wherein one of the metrics is a user transaction metric having a numerical value based on a number of web page credit card transactions completed by the subset of users.

37. The system of claim 29, wherein one of the metrics is a price metric having a numerical value based on at least one of a cost per mille (CPM) of impressions served to the subset of users, and a cost per click (CPC) of impressions clicked on by the subset of users.

38. The system of claim 29, wherein one of the metrics is a top web page metric having a numerical value based on a number of bid requests generated relative to other logged web pages.

39. The system of claim 29, wherein one of the metrics is a referral metric having a numerical value based on a plurality of prior web page visits by the subset of users prior to visiting the web page.

40. The system of claim 29, wherein one of the metrics is an ad coverage metric having a numerical value based on at least one of a percentage of the web page occupied by ads, a presence of overlapping ads in the web page, and a number of ads requested per page load.

41. The system of claim 29, wherein the web traffic database is configured to store logged web traffic comprising the visits by the users to the web pages by:
  receiving a first set of web traffic log entries from one or more ad exchanges comprising bid requests for advertising space to be placed on the web pages;
  receiving a second set of web traffic log entries responsive to execution of software code present in one or more pixel tags included in the web pages; and
  receiving a third set of web traffic log entries responsive to execution of software code associated with one or more cookies stored by the user agents of the users.

42. A system comprising:
  a web traffic database storing logged web traffic comprising visits by a plurality of users to a plurality of web pages, each web page receiving visits from a plurality of users;
  a user identifier (UID) database storing a mapping of each of a plurality of UIDs to one or more items of user identifying information;
  a processor associated with the UID database, configured to:
    extract items of user identifying information from logged web page visits stored in the web traffic database;
    for each of a subset of the UIDs, associate a subset of the logged web page visits with the UIDs based on the extracted items of user identifying information of the subset of the logged web page visits and the items of user identifying information mapped to by the UID in the UID database;
  an ad server comprising one or more processors configured to:

identify a subset of logged web page visits as visits to a web page by the subset of UIDs;

calculate user agent scores for the subset of UIDs, each user agent score for a UID of the subset of UIDs, the user agent score having a numerical value based on logged web page visits associated with the UID from a number of different versions of a same user agent;

calculate a rogue visitor metric based on the user agent scores of the subset of UIDs; and calculate a honeypot web page score indicating a confidence that the web page is a honeypot web page that is artificially inflating its own web traffic, the honeypot web page metric based on the rogue visitor metric.

43. The system of claim 42, wherein the honeypot web page score is further based upon a volume metric having a numerical value based on at least one of a number of bid requests triggered by the subset of users, a number of impressions received by the subset of users, and a number of web page actions associated with the subset of users.

44. The system of claim 42, wherein the honeypot web page score is further based upon a velocity metric having a numerical value based on at least one of a number of bid requests triggered by the subset of users over a period of time, a number of impressions received by the subset of users over the period of time, and a number of web page actions associated with the subset of users over the period of time.

45. The system of claim 42, wherein the honeypot web page score is further based upon at least one of:
a click-through rate (CTR) metric having a numerical value based on a number of impressions the subset of users click on relative to a number of impressions the subset of users receive,
a conversion per impression (CVR) rate metric having a numerical value based on a number of conversions the subset of users carry out relative to relative to a number of impressions the subset of users receive, and
a conversion per click rate metric having a numerical value based on a number of conversions the subset of users carry out relative to relative to a number of impressions the subset of users click on.

46. The system of claim 42, wherein each user agent score for a UID is further based on user web traffic comprising simultaneous or near simultaneous web actions from multiple user agents originating from a user associated with the UID.

47. The system of claim 42, wherein the honeypot web page score is further based upon a user transaction metric having a numerical value based on a number of web page credit card transactions completed by the subset of UIDs.

48. The system of claim 42, wherein the honeypot web page score is further based upon a price metric having a numerical value based on at least one of a cost per mille (CPM) of impressions served to the subset of users, and a cost per click (CPC) of impressions clicked on by the subset of users.

49. The system of claim 42, wherein the honeypot web page score is further based upon a top web page metric having a numerical value based on a number of bid requests generated relative to other logged web pages.

50. The system of claim 42, wherein the honeypot web page score is further based upon a referral metric having a numerical value based on a plurality of prior web page visits by the subset of UIDs prior to visiting the web page.

51. The system of claim 42, wherein the honeypot web page score is further based upon an ad coverage metric having a numerical value based on at least one of a percentage of the web page occupied by ads, a presence of overlapping ads in the web page, and a number of ads requested per page load.

52. The system of claim 42, wherein the web traffic database is configured to store logged web traffic comprising the visits by the users to the web pages by:
receiving a first set of web traffic log entries from one or more ad exchanges comprising bid requests for advertising space to be placed on the web pages;
receiving a second set of web traffic log entries responsive to execution of software code present in one or more pixel tags included in the web pages; and
receiving a third set of web traffic log entries responsive to execution of software code associated with one or more cookies stored by the user agents of the users.

* * * * *